March 19, 1940.  M. H. GRAHAM  2,194,117
FOOD PROCESSING VESSEL
Filed Oct. 6, 1938  3 Sheets-Sheet 1
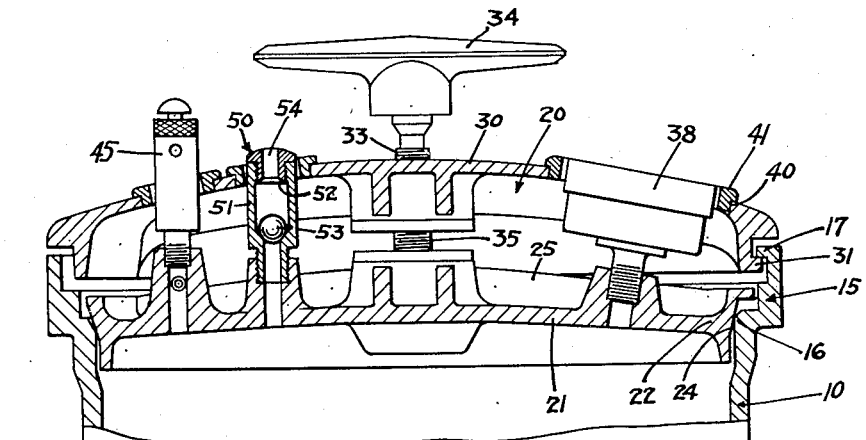
FIG. 1
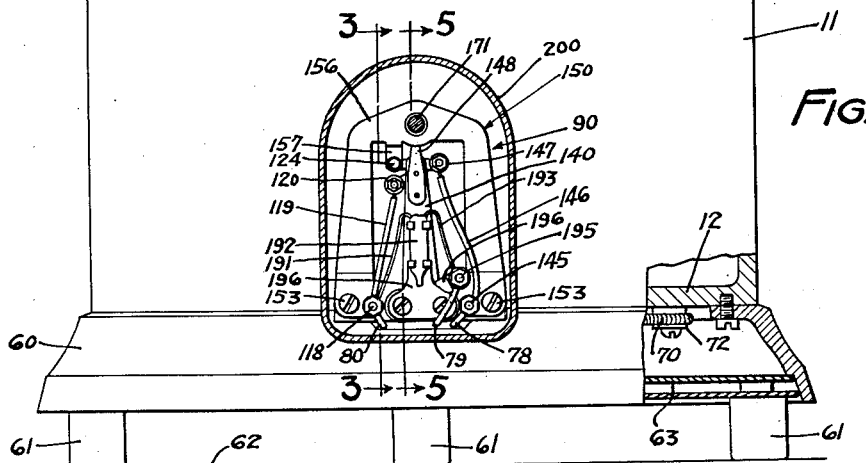
FIG. 3
FIG. 9
INVENTOR
MAURICE H. GRAHAM
By Paul, Paul, Moore & Giese
ATTORNEYS

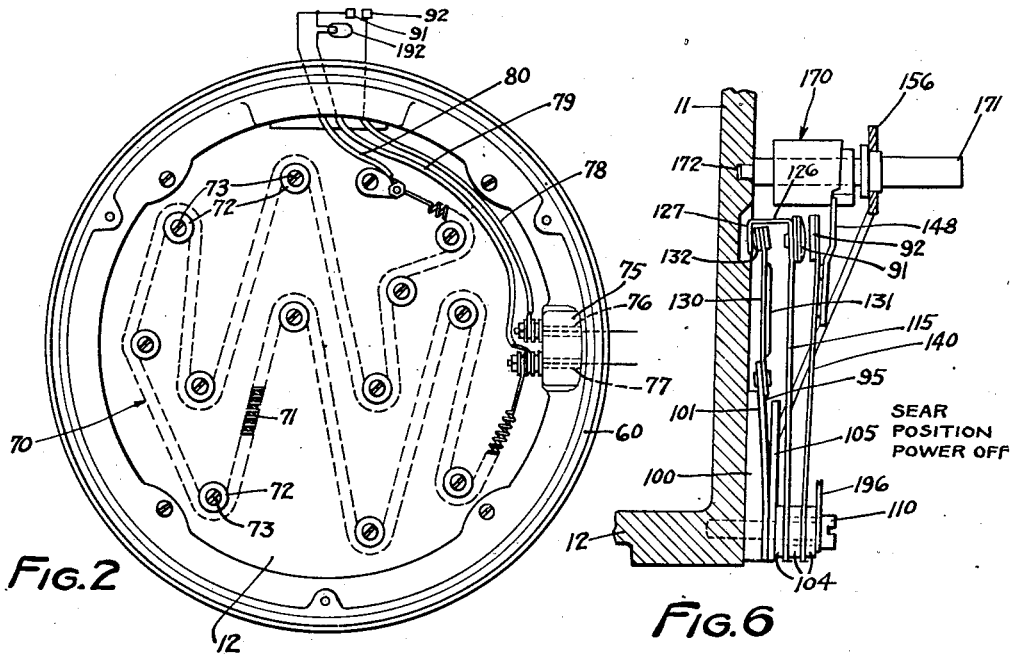

March 19, 1940.　　M. H. GRAHAM　　2,194,117
FOOD PROCESSING VESSEL
Filed Oct. 6, 1938　　3 Sheets-Sheet 3

INVENTOR
MAURICE H. GRAHAM
By Paul, Paul, Moore & Fiero
ATTORNEYS

Patented Mar. 19, 1940

2,194,117

UNITED STATES PATENT OFFICE 2,194,117

FOOD PROCESSING VESSEL

Maurice H. Graham, Minneapolis, Minn.

Application October 6, 1938, Serial No. 233,609

18 Claims. (Cl. 219—44)

The present invention relates to new and useful improvements in food processing devices and to new and useful improvements in methods of operating the same and particularly to an electrically heated vessel in which foods may be pressure cooked, seared, roasted, or cooked by a combination of such cooking methods.

The present application is related to my application Serial No. 178,147, filed December 4, 1937, for "Food processing vessel," and is a continuation in part of subject matter common to said application and the present application.

I have discovered that in a food processing vessel in which foods are treated at elevated temperatures with steam generated by the application of heat to the vessel, and particularly to a food processing vessel in which the heating of the vessel is automatically controlled so as to maintain a constant pressure within the vessel, that a relatively constant pressure can be maintained, provided air is carefully exhausted from the vessel and the heating is controlled in accordance with the temperature within the vessel, or in accordance with the temperature of a heat conducting member which is in close thermal communication with the interior of the vessel.

I have discovered that the pressure can be maintained constant automatically by a thermostatic device located outside of the vessel provided the thermostatic device is in close thermal communication with the interior of the vessel, that is to say, provided the thermostatic device is thermally connected to the interior of the vessel. It is therefore an object of the present invention to provide a method of operating a food processing vessel whereby the temperature of the vessel is used in maintaining the pressure constant. It is also an object to provide a food processing vessel of the pressure cooker type in which a substantially constant pressure is maintained automatically.

It is another object of the invention to provide a heating element for the vessel which is thermostatically controlled by a thermostatic element located on the outer surface of the vessel, which element is in close thermal communication or thermally connected to the interior of the vessel, whereby a constant pressure is maintained within the vessel.

It is a further object of the invention to provide means under the control of the temperature within the vessel for automatically exhausting air from the vessel.

It is an object of the invention to provide an electrically heated cooking vessel in which a single manually manipulatable element controls the operating temperature and pressure of the vessel.

It is also an object of the invention to provide an electrically controlled pressure cooking vessel which may alternatively be used as a roasting or searing vessel, and it is an ancillary object to provide in such vessel a single manual control for varying (1) the pressure under which the vessel operates, (2) for providing a searing temperature or temperatures, and (3) completely interrupting the heating of the vessel.

It is a further object of the invention to provide a novel and useful thermostatic mechanism of exceptional accuracy and responsiveness for mounting on the outside wall of a metal-walled pressure cooking vessel, for accurately controlling the heat input and hence the pressure and temperature conditions within the vessel.

Other and further objects of the invention are those inherent in the invention, the embodiments of which are herein illustrated, described and claimed.

Figure 1 which is a side elevational view partly in section of the heat processing vessel of the present invention.

Figure 2, the bottom view with the bottom cover plate removed so as to show the heating elements of the vessel.

Figure 3 is an enlarged sectional view along the lines 3—3 of Figure 1.

Figure 5 is a sectional view along the line 5—5 of Figure 1 showing the regulating mechanism set to the "searing" position.

Figure 4:
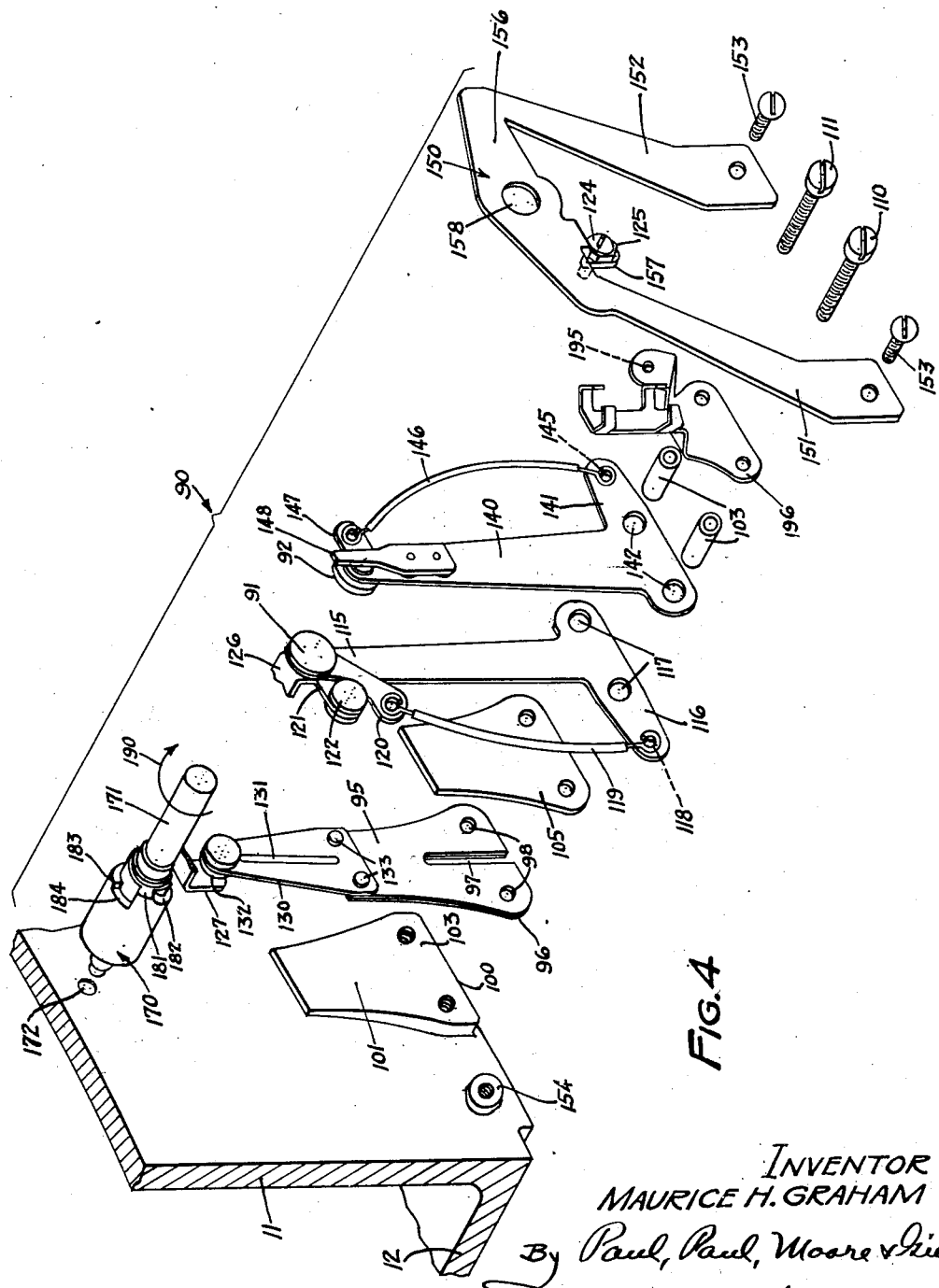
Figure 4 is an isometric view of the regulating mechanism showing the parts separated from each other.

Figure 6 corresponds to Figure 5 except that the contacts are shown in the "open" position.

Figure 7 is a view similar to that shown in Figure 5 except that the regulating mechanism is adjusted to a "pressure" position.

Figure 8 is a view similar to that shown in Figure 5 except that the regulating mechanism is adjusted to the "off" position.

Figure 9 is a fragmentary front elevation view showing the regulating mechanism with the cover and operating handle therefor in place.

The food processing vessel of the present invention consists of a container having a lower portion generally designated 10, which is preferably made from cast aluminum or other strong metal having a high coefficient of heat transmission. The vessel consists of a side wall portion 11 and a bottom portion 12 which are preferably formed integrally as by casting.

The vessel may be provided with a cover of any approved construction. As shown in Figure 1 the upper edge of the wall 11 is provided with a locking rim arrangement generally designated 15 with which the cover structure, generally designated 20, cooperates. The rim 15 has a pressure seal edge 16 and a bayonet fastening rim 17.

The cover generally designated 20 includes an inner cover 21 having a flanged rim 22. The flange 22 includes a conical surface 24 which seats on the pressure seal edge 16 of the container 10.

The inner cover is provided with adequate cross bracing webs 25 which serve not only to stiffen the cover but also to carry the forces produced by the locking mechanism carried on outer cover 30. The latter is provided with a plurality of bayonet teeth 31 which cooperate with the bayonet locking flange 17 of the vessel. A hand screw 33 is threaded into the outer cover and is arranged to be rotated by a removable handle 34. The lower end 35 of the screw bears against the inner cover 25 and forces the latter into tight engagement with the vessel 10.

The inner cover 21 is provided with a gauge 38 which projects through opening 40 of the outer cover. The opening is preferably ornamented by rim 41 of molded resinous material or bright metal. The cover is also provided with a combined manual and over-pressure release valve 45 and with an automatic air vent valve 50. Both of these project through openings in the outer cover which are ornamented by rims of molded resinous material or bright metal.

The automatic air-vent generally designated 50 consists of a barrel 51 which has a valve seat 52 formed at its upper end. Within the barrel there is positioned a ball 53 of steel, the diameter of which is slightly less than the diameter of barrel 51. When relatively dry air is forced from the vessel through vent 54, the air passes between the ball 53 and the barrel 51 without appreciably raising the ball. However, when steam strikes the ball it is raised due to the sealing effect of the condensed moisture and the ball 53 is therefore raised by the uprush of steam until it strikes against the valve seat portion 52. No further steam is then permitted to pass through vent 54. The automatic air-vent 50 thus provides for exhausting the air from the cooking vessel upon initial heating and for sealing the vessel when a substantial amount of steam begins to escape. Other automatic air-vents may be substituted for the ball check valve vent herein illustrated.

The cooking vessel is supported upon a rim 60 which is preferably a casting which is enameled or otherwise decorated. Rim 60 is provided with feet 61 which support it a sufficient distance from surface 62 so that the surface 62 will not be damaged by heat when the vessel is operating. A base cover 63 is provided within the rim and serves to protect the heating element 70, which is positioned in the space between the bottom 12 of the cooking vessel and cover 63.

The heating element 70 in the present instance consists of a coil 71 of heat resistant alloy which is supported upon a plurality of porcelain knobs 72. The latter are in turn fastened to the bottom 12 by means of screws 73. At one side of base 60 there is formed a recess 75 which is provided with terminals 76 and 77. Terminal 77 is connected directly to the heating element and terminal 76 is connected by wire 78 to the switching apparatus hereinafter to be described. Wires 79 and 80 provide the circuit connections to the regulating apparatus 90 and to an indicator light 192 as described below.

Any other heating element may be substituted for that specifically illustrated herein. Thus other types of elements may be substituted for the open coil element herein illustrated or a flat type heating element similar to those used in electric flatirons may be used.

The automatic pressure-temperature control 90 for the cooking vessel is positioned on the outer wall 11, as shown in Figure 1 and consists of a pair of contacts 91 and 92 which are operated through the medium of a bimetallic thermostatic element 95. The outer wall 11 of the vessel is provided with a boss 100 which corresponds approximately to the area of bimetallic element 95. The surface 101 of boss 100 is curved as in Figures 3 through 8, the shape of the curve being approximately the same as the curve assumed by bimetallic element 95 when the latter is heated to the maximum temperature reached during operation of the cooking vessel. The element 95 is mounted with its lower portion 96 against the lower portion 103 of the boss 100. Overlying the element 95 there is positioned a heat communicator and shield 105 of aluminum or other good heat conducting material. The heat shield 105 is thermally connected to the wall of the cooking vessel by means of the heavy screws 110 and 111 which serve to hold the bimetallic element and other elements of the regulating mechanism in assembled relation.

At room temperature the bimetallic element 95 is approximately parallel to the flat heat communicator and shield 105, all as shown in Figure 3 but when the vessel is heated to, for example, searing temperature the bimetallic element 95 flexes into the shape shown in Figure 6, wherein it will be seen as closed following the curve of boss 101.

Contact 91 is carried by a contact arm 115 which is of steel or other springy material. The lower portion of the strip of contact arm 115 has an integrally formed cross piece 116 which is provided with holes 117 for the reception of insulator bushings 103 which are carried on screws 110 and 111. The cross piece 116 extends sufficiently to the left as shown in Figure 4 to serve as a mounting for a contact stud 118 which is illustrated in Figure 1. A pigtail 119 connects the stud 118 to the contact-carrying plate 120 and in this way the strip 115 is relieved of carrying all of the load current.

The upper portion of strip 115 is provided with an ear 121 which extends to the left as shown in Figure 4 to which is fastened button 122. The latter is aligned with a stop screw 124 which serves to limit movement of the contact and spring strip 115 in a direction away from the wall 11.

The upper tip of contact arm 115 is bent backwardly as shown at 126 and then downwardly as shown at 127. This portion of the contact arm cooperates with an extension 130 on the bimetallic strip 95. Extension 130 is of stainless steel or other strong metal and is of very thin stock, the necessary stiffness being provided by a longitudinal ridge 131. The upper tip of strip 130 is provided with an operating button 132 and the entire extension arm 130 is riveted to the bimetallic strip 95 by means of rivets 133.

The contact 92 is mounted upon a similar strip 140 of steel or other spring material. The strip 140 is provided at its base with an integrally formed cross piece 141 which is apertured at 142 to receive bushings 103 on supporting screws 110 and 111. The cross piece 141 carries a contact stud 145 shown in Figure 1. A pigtail 146 is connected to stud 145 and extends to the contact-carrying plate 147 at the upper end of the strip 140. The strip 140 is also provided with a finger 148 of stiff material which cooperates with the manually adjustable regulating cam 170 as shown in Figures 3, 5, 6, 7 and 8.

The outer frame 150 of the assembly consists of downwardly and backwardly extending legs 151 and 152 which are joined together at their upper ends by cross piece 156, legs 151 and 152 are fastened to a pair of bosses on the cooking vessel by means of screws 153. One of the bosses is illustrated at 154 in Figure 4. The upper crosspiece 156 is provided with a downwardly extending arm 157 which carries adjustment screw 124, and a locking nut 125, and also with an aperture 158 which serves as the outer journal for shaft 171 of regulating cam 170. The inner end of shaft 170 is of reduced diameter and is journaled in aperture 172 formed in the kettle wall. The shaft 171 has an integrally formed flange at 173 against which the inner surface of upper cross-piece 156 bears and the frame 150 is formed so that when screws 153 are pulled down tightly a slight tension will be placed on flange 173 by the frame.

The regulating cam generally designated 170 is mounted on shaft 171 by means of a set screw 175 as shown in Figure 8. The outermost surface of cam 170 is formed with a cam track generally designated 180 which cooperates with finger 148 of the contact carrying strip 140.

The cam track 180 has a portion 181 best illustrated in Figures 4 and 8 which is the portion of the cam farthest from the vessel wall 11.

Adjacent the portion 181 in the counterclockwise direction as viewed in Figure 4, there is a gradually sloping cam portion 182 which winds almost around the cam to break 183. The portion 182 corresponds to the "Pressure-temperature" range of the cooking vessel. At the termination of cam 182 there is a break 183 and then another shorter cam section 184 which corresponds to the "Searing" range of the vessel.

As shown in Figure 9 the regulator mechanism is enclosed by a cover 200 which is provided with a scale 201 denoting the "Off" position, the "Pressure" range of 5, 10, 15 and 20 pounds and the searing or baking range from "Sear" to "Hot sear." Adjustment of the position of shaft 171 is accomplished by means of a knob 202 has a pointer 203. The knob 202 is oriented on shaft 171 in a position such that pointer 203 is aligned with the "Off" position when segment 181 of the cam is engaged by the tip of finger 148.

When the upwardly extending finger 148 is poised on portion 181 as shown in Figure 8 the regulator is in the "Off" position, and contact-carrying arm 140 is moved to the right a distance sufficient that contact 92 is permanently separated from contact 91. In this connection it should be noted that adjustment screw 124 illustrated in Figures 3 and 4 rests against button 122 on contact-carrying arm 115 and serves to determine the maximum position to the right to which contact arm 115 may move. It will be remembered that contact arm 115 is of spring material and it is tensioned so as to move to the right against the adjustment screw 124 when the arm 115 is free. When the shaft 171 is rotated in a clockwise direction from the position in Figure 8 the upwardly extending finger 148 will drop off of the portion 181 and onto the adjacent portion 182 of a cam track 180. In this position the contact-carrying arm 140 is as shown in Figure 7 and corresponds to the lowest "pressure-temperature" operating condition of the vessel. The contacts are closed under such condition and current flows from terminal 76 by way of wire 78 to stud 145 and thence by pigtail 146 to contact plate 147 and to contact 92. Current then flows to contact 91 and thence by way of contact plate 120, pigtail 119, stud 118 and connection 80 to the heating element 70 and thence through the heating element to terminal 77.

At the same time a circuit is established from terminal 76 through connection 78, stud 145, pigtail 146, contact 92, contact 91, pigtail 119, stud 118, connection 191 to glow lamp 192, and thence by connection 193 to stud 195 which is carried on glow lamp mounting plate 196. From stud 195 the circuit continues over line 79 to terminal 77.

It is noted here that stud 195 is insulated from the bracket 196 which carries glow lamp 192. Contact-carrying arms 115 and 140, however, while insulated from each other are in circuit connection with studs 118 and 145, respectively. The contact-carrying arms, however, are insulated from each other and from the vessel 11 by insulating sleeves 103 and insulating washers 104, as shown in Figure 5.

As the heating element supplies heat to the vessel, steam is generated therein either due to added water or due to adherent moisture in the foods being processed. The air within the vessel will initially be exhausted by way of automatic air vent 50 but as soon as the air is driven out of the vessel and steam begins to escape through vent 54 the ball 53 will be raised and seated against seal 52. Thereafter the pressure will rise in the processing vessel and the temperature of the vessel will rise to a corresponding degree. Due to the fact that bimetallic element 95 is in close thermal communication or in other words, thermally connected with boss 101 of vessel wall 11 and through the vessel wall to the interior of the vessel, bimetallic element 95 very rapidly reflects any rise in temperature of the vessel 11. The thermal connection between bimetallic element 95 and the interior of the vessel is also enhanced by the heat communicator and shield 105 which is likewise thermally connected to the vessel by heavy studs 110 and 111. Member 105 overlies the bimetallic strip 95 and thus protects it from extraneous radiation, while at the same time supplying heat at the temperature of the vessel wall. Heat is supplied to strip 95 due to its direct connection to boss 101, and also due to radiation from the boss and heat communicator shield 105. It will also be noted that as the bimetallic element 95 flexes it always curves toward the vessel as shown in Figure 6 and accordingly serves to enhance the heat transfer from the vessel to the bimetallic element 95. In this way the action of the bimetallic element is maintained at a high degree of responsiveness and accuracy throughout its travel from its low temperature to its high temperature condition. It is noted that the weight of bimetallic element 95 is extremely small and that a very small amount of heat is accordingly necessary to be transmitted from the vessel to the element 95 in order that the latter be brought to the same temperature as the vessel. The light weight of element 95, the close thermal connection between the element 95 and the interior of the vessel and the association of parts which serves to maintain the close thermal communication and connection constant through the working range of the bimetallic element, all serve to give an exceedingly high degree of responsiveness and accuracy. It is also noted that element 95 is provided with a slot 97 throughout a portion of its length adjacent the fastening holes 98. This slot reduces the effect of transverse flexing which otherwise occasionally produces slightly irregular operation.

As the pressure of the vessel rises due to the application of heat to the base thereof, the bimetallic element 95 responds due to the corresponding rise in temperature. When the pressure reaches a predetermined point as determined by the setting of cam 170 the button 132 on the tip of extension arm 130 of the bimetallic element 95 presses against the hooked-over end 127 of contact-carrying arm 115, all as shown in Figure 6 and draws the arm to the left. Contact 91 is thereby separated from contact 92 and the application of power to the heating element 70 and lamp 192 is interrupted.

The cooking vessel then cools due to radiated heat and due to the absorption of heat by foods being processed and as the vessel cools bimetallic element 95 moves toward the right and toward the position shown in Figure 7 until contact 91 is again permitted to engage contact 92. The heating element and signal lamp circuits are then re-established as described above and heating of the vessel ensues. Heating of the vessel is continued until the pressure-temperature again rises and is interrupted as described above.

In order to increase the operating pressure-temperature of the vessel it is only necessary to rotate knob 202 and hence shaft 171 in the direction of arrow 190 (see Figure 4). This permits the tip of finger 148 to move slightly towards the vessel wall 11 or to the left as shown in Figures 5–8. This is due to the inclination of cam surface 182. The new position for contact 92 which is established requires a higher pressure-temperature before the breaking of the contacts is accomplished. The heating of the vessel therefore ensues and is continued until the newly established pressure-temperature is reached, and is thereafter continued periodically as previously. By this method the pressure may be maintained within approximately one-half pound (or approximately one degree) at any pressure within the range indicated.

When it is desired to use the food processing vessel for roasting or searing the cover 20 is removed or only loosely placed on the vessel.

By loosely placing the cover 20 on the vessel so as to prevent the development of pressure therein the vessel may be used for baking operations due to the rapid heat conductivity of the vessel wall and the baking temperature adjusted by means of the position of cam 170.

To accomplish searing or roasting the shaft 171 is then rotated by means of knob 202, until the tip of finger 148 drops into the searing notch 184 which as previously explained also has an inclined bottom so as to provide a range of searing temperatures. Under searing conditions the heat communicated to bimetallic element 95 is entirely due to the heat conducted along the bottom 12 of the vessel to boss 100, whereas under pressure operating conditions the heat conducted to boss 100 is only partly due to that carried by the bottom 12 and partly due to the circulation of steam within the vessel. I have discovered that under pressure-operating condition of the temperature differential between the hottest portion of the bottom 12 and boss 100 is but a few degrees, whereas during open kettle searing or baking operating conditions a slightly greater temperature differential is maintained. Nevertheless the temperature of bimetallic element 95 accurately follows the variations in temperature of the bottom 12 of the cooking vessel and as the temperature rises to searing or baking temperature the contacts are separated as previously described and the application of power to heating element 70 is interrupted. When the vessel cools due to radiation or due to absorption of heat by the foods being processed, the temperature of the bottom 12 is again decreased and bimetallic element 95, which follows the temperature of the bottom very closely, moves to the right as shown in Figure 5 and permits contact 91 to engage contact 92, thus again applying power to the heating element. Power will thus be applied intermittently as long as it is desired to use the vessel at searing or baking temperatures.

It will thus be seen that I have provided a food processing vessel which may be used alternatively as a pressure cooker and as a searing or baking vessel and which is provided with an automatic heating arrangement and automatic pressure control by which the pressure of the vessel may be regulated when the vessel is operating as a pressure cooker and by which the temperature of the vessel may be regulated when the vessel is operating in its searing or baking capacities. It is also apparent that I have provided a circuit controlling mechanism for a food processing vessel of the above type by which the temperture and/or pressure of the vessel may be varied as desired, or the operation of the vessel entirely interrupted.

It is obvious that many variations may be made in the details of the devices described herein. Thus in the switching mechanism shown and described the position of contact 92 is varied with reference to the bimetal element in order to vary the temperature at which separation of the contacts takes place. It is obvious that this might also be accomplished by a variable coupling between the contact and bimetal element or by a variation in the position of the bimetallic element. Thus I may vary the positioning, or coupling of the switch or actuating mechanism or both, the criteria being to provide a unitary mechanism which at once varies the pressure-temperature, and which may entirely interrupt the operation of the vessel. Likewise the regulating mechanism may be mounted on the bottom of the vessel, or on the side as desired. These and many other variations may be made in the apparatus without departing from the spirit of the invention illustrated, described and claimed.

I claim as my invention:

1. A pressure cooker in which foods are treated at elevated temperatures and at elevated pressures with steam generated by application of heat to the vessel, comprising an enclosing envelope of heat conducting material, an electrical heating element for said envelope, an electrical circuit for said heating element, including a circuit interrupting switch, actuating means on the outside of said vessel positioned for opening and closing said switch, said means including a thermostatic element thermally connected to the heat conducting envelope of the vessel, and manually movable means for varying the positioning of the switch and actuating means relative to each other, the range of movement of said manually movable means being sufficient that the switch is held open in one position.

2. A pressure cooker in which foods are treated at elevated temperatures and at elevated pressures with steam generated by application of heat to the vessel, comprising an enclosing envelope of heat conducting material, an electrical heating element for said envelope, an electrical circuit for said heating element including a circuit interrupting switch, actuating means on the outside of said vessel positioned for opening and closing said switch, said means including a thermostatic element thermally connected to the heat conducting envelope of the vessel, and manually operable means for gradually varying the positioning of the switch and actuating means relative to each other and for abruptly varying such position sufficiently to hold said switch open.

3. An electric pressure cooker in which foods may be treated at elevated temperatures and at elevated pressures with steam generated by application of heat to the vessel or at elevated temperatures, comprising an enclosing envelope of heat conducting material, an electrical heating element for said envelope, an electrical circuit for said heating element, including a circuit interrupting switch, actuating means on the outside of said vessel positioned for opening and closing said switch, said means including a thermostatic element thermally connected to the heat conducting envelope of the vessel, and manual means for selectively varying the positioning of the switch and actuating means with respect to each other throughout a predetermined range corresponding to the pressure-temperature operating range of the vessel, for abruptly varying said positioning to another range corresponding to elevated searing or baking temperatures, and for abruptly varying said positioning to a position at which said switch remains open corresponding to the non-operating condition of said vessel.

4. A food processing vessel for use alternatively as a pressure cooker and as a searing and baking vessel, comprising an envelope of metal having a high coefficient of heat transmission, a thermally movable thermostatic element mounted on the outside walls of the vessel and thermally connected to the said wall, an electrical heating unit for said vessel, an electrical circuit for said heating unit, including contact means for interrupting said circuit, said contact means being coupled to the thermostatic element to be operated thereby, means including a manually rotatable member for uncoupling the thermostatic element and contact means, and for varying the coupling between said element and contact means.

5. An electric pressure cooker comprising a vessel of heat conducting material having a bottom and side walls, an electrical heating element for said vessel positioned adjacent said bottom, a circuit for said heating element, an electrical control for said heating element circuit positioned on the wall of said vessel, said control including circuit interrupting contacts, a thermostatic element mounted on the wall of the vessel for operating said contacts, and a manually operable means for positively opening said contacts.

6. An electric pressure cooker comprising a vessel of heat conducting material having a bottom and sidewalls, an electrical heating element for said vessel positioned adjacent said bottom, a circuit for said heating element, an electrical control for said heating element circuit positioned on the wall of said vessel, said control including a pair of circuit interrupting contacts, thermostatic means capable of moving with changes in temperature, said means being thermally connected to the heat conducting side wall of the vessel, said contacts being positioned in the path of movement of the thermostatic element so as to be operated when the thermostatic element moves with change in temperature.

7. A pressure cooker comprising a vessel of heat conducting material having a bottom and side walls, an electrical heating element for said vessel positioned adjacent said bottom, a circuit for said heating element, an electrical control for said heating element circuit positioned on the wall of said vessel, said control including a pair of circuit interrupting contacts, thermostatic means capable of moving with changes in temperature, said means being thermally connected to the vessel, said contacts being positioned in the path of movement of the thermostatic element so as to be operated when the thermostatic element moves with change in temperature, and manually operable means for varying the relative position of the thermostatic means and circuit interrupting contacts from a relative position in which the contacts are not operated when the thermostatic element moves to a position in which the contacts are operated.

8. An electric pressure cooker comprising a vessel of heat conducting material having a bottom and side walls, an electrical heating element for said vessel positioned adjacent said bottom, a circuit for said heating element, an electrical control for said heating element circuit positioned on the wall of said vessel, said control including contact means, thermostatic means capable of moving with changes in temperature, said means being thermally connected to the heat conducting vessel, said contact means being positioned to be engaged by the thermostatic element when the latter is heated.

9. An electric pressure cooker comprising a vessel of heat conducting material having a bottom and side walls, an electrical heating element for said vessel positioned adjacent said bottom, a circuit for said heating element, an electrical control for said heating element circuit positioned on the wall of said vessel, said control including contact means, thermostatic means capable of moving with changes in temperature, said means being thermally connected to the heat conducting vessel, and manually operable means for varying the relative position of the thermostatic means and contact means from a relative position in which the contact means is in circuit opening condition to a series of adjacent positions in which the contact means is operated by the thermostatic element.

10. An electric pressure cooker comprising a vessel of heat conducting material, an electrical heating element for said vessel, a circuit for said heating element, an electrical control for said heating element circuit, said control including circuit interrupting contacts, a thermostatic element mounted in contact with the vessel for operating said contacts, and a manually operable means for positively opening said contacts.

11. An electric pressure cooker comprising a vessel of heat conducting material, an electrical heating element for said vessel, a circuit for said heating element, an electrical control for said heating element circuit, said control including a pair of circuit interrupting contacts, thermostatic means capable of moving with changes in temperature, said means being thermally connected to the heat conducting vessel, said contacts being positioned in the path of movement of the thermostatic element so as to be operated when the thermostatic element moves with change in temperature.

12. An electric pressure cooker comprising a vessel of heat conducting material, an electrical heating element for said vessel, a circuit for said heating element, an electrical control for said heating element circuit, said control including a pair of circuit interrupting contacts, thermostatic means capable of moving with changes in temperature, said means being thermally connected to the heat conducting vessel, said contacts being positioned in the path of movement of the thermostatic element so as to be operated when the thermostatic element moves with change in temperature and manually operable means for varying the relative position of the thermostatic means and circuit interrupting contacts from a relative position in which the contacts are not operated when the thermostatic element moves to a position in which the contacts are operated.

13. An electric pressure cooker comprising a vessel of heat conducting material, an electrical heating element for said vessel, a circuit for said heating element, an electrical control for said heating element circuit, said control including contact means, thermostatic means capable of moving with changes in temperature, said means being thermally connected to the heat conducting vessel, said contact means being positioned to be engaged by the thermostatic element when the latter is heated.

14. A vessel in which foods are treated at elevated temperatures and with steam under pressure generated by application of heat to the vessel, comprising an enclosing envelope, a heating element for said envelope, thermostatic means capable of moving with changes in temperature mounted on the outside of said vessel, said means being in close thermal communication with the interior of the vessel, an adjustable electrical contact, a cooperating movable contact positioned to be moved by said thermostatic means as it moves in accordance with temperature changes of said vessel and means for selectively positioning the adjustable contact out of the range of movement of the thermostatic means and within the range of movement of the thermostatic means.

15. A pressure cooker in which foods are treated at elevated temperatures and with steam under pressure generated by application of heat to the vessel or by heat alone without pressure, comprising an enclosing envelope, a heating element for said envelope, thermostatic means capable of moving with changes in temperature mounted on the outside of said vessel, said means being in close thermal communication with the interior of the vessel, an adjustable electrical contact, a cooperating movable contact positioned to be moved by said thermostatic means as it moves in accordance with temperature changes of said vessel, and manually actuable means for selectively positioning the adjustable contact out of the range of movement of the thermostatic means and at any one of a series of adjacent positions within the range of movement of the thermostatic means when the latter is heated by heat from said vessel to temperatures corresponding to the temperature of the vessel throughout the working range of pressures thereof.

16. A vessel in which foods are treated at elevated temperatures and with steam under pressure generated by application of heat to the vessel, comprising an enclosing envelope, a heating element for said envelope, thermostatic means capable of moving with changes in temperature mounted on the outside of said vessel, said means being in close thermal communication with the interior of the vessel, an adjustable electrical contact, a cooperating movable contact positioned to be moved by said thermostatic means as it moves in accordance with temperature changes of said vessel, and manually actuable means for selectively positioning the adjustable contact out of the range of movement of the thermostatic means at any one of a series of adjacent positions within the range of movement of the thermostatic means when the latter is heated by heat from said vessel to temperatures corresponding to the temperature of the vessel throughout the working range of pressures thereof and at a position spaced from the positions of said series and within the path of movement of the thermostatic means when the latter is heated by the vessel to a temperature corresponding to the searing temperature of the vessel.

17. A vessel in which foods may be treated at elevated temperatures and with steam under pressure generated by application of heat to the vessel or at elevated temperatures without pressure, comprising an enclosing envelope, a heating element for said envelope, thermostatic means capable of moving with changes in temperature mounted on the outside of said vessel, said means being in close thermal communication with the interior of the vessel, an adjustable electrical contact, a cooperating movable contact positioned to be moved by said thermostatic means as it moves in accordance with temperature changes of said vessel and manually actuable means for selectively positioning the adjustable contact out of the range of movement of the thermostatic means at any one of a series adjacent positions within the range of movement of the thermostatic means when the latter is heated by heat from said vessel to temperatures corresponding to the temperature of the vessel throughout the working range of pressures thereof, and at a second series of adjacent positions spaced from the said first mentioned series, said second series of positions being within the path of movement of the thermostatic means when the latter is heated by the vessel to a temperature corresponding to the range of searing temperatures of the vessel.

18. An electric pressure cooker, comprising a vessel of heat conducting material, an electrical heating element for said vessel, an electrical circuit for said heating element including a switch, bimetallic strip means attached to the outer surface of the vessel and positioned to open the switch as the vessel is heated, said bimetallic strip means being split throughout a portion of its length adjacent the point of attachment to the vessel wall.

MAURICE H. GRAHAM.